(12) United States Patent
Sengul et al.

(10) Patent No.: US 9,803,964 B2
(45) Date of Patent: Oct. 31, 2017

(54) VACUUM POWERED BULLET HOLDER SYSTEM FOR BALLISTIC ANALYSIS

(71) Applicant: TUBITAK, Ankara (TR)

(72) Inventors: Orhan Sengul, Ankara (TR); Levent Burak Yalciner, Ankara (TR)

(73) Assignee: TUBITAK, Ankara (TR)

( * ) Notice: Subject to any disclaimer, the term of this patent is extended or adjusted under 35 U.S.C. 154(b) by 0 days.

(21) Appl. No.: 14/443,365

(22) PCT Filed: Nov. 16, 2012

(86) PCT No.: PCT/IB2012/056508
§ 371 (c)(1),
(2) Date: May 15, 2015

(87) PCT Pub. No.: WO2014/076523
PCT Pub. Date: May 22, 2014

(65) Prior Publication Data
US 2015/0316364 A1    Nov. 5, 2015

(51) Int. Cl.
*F42B 35/00* (2006.01)
*B65G 47/91* (2006.01)
*B25J 15/06* (2006.01)
*B66C 1/02* (2006.01)

(52) U.S. Cl.
CPC .............. *F42B 35/00* (2013.01); *B65G 47/91* (2013.01); *B25J 15/0616* (2013.01); *B66C 1/0212* (2013.01)

(58) Field of Classification Search
CPC ....... F42B 35/00; B65G 47/91; B66C 1/0212; B25J 15/0616

USPC .......... 294/189, 186, 188, 183; 269/21, 186, 269/189; 356/388, 394, 391; 901/40
See application file for complete search history.

(56) References Cited

U.S. PATENT DOCUMENTS

| 1,987,336 | A | * | 1/1935 | Powell | ................ G01N 33/085 198/432 |
| 2,545,043 | A | * | 3/1951 | Odenthal | ................ H01K 3/32 294/184 |
| 2,634,998 | A | * | 4/1953 | Flower | ..................... H01K 3/32 248/363 |
| 3,167,326 | A | * | 1/1965 | Heessels | ................ B65G 47/91 248/363 |
| 3,330,589 | A | * | 7/1967 | Mumma | ................ A01K 43/00 294/189 |
| 3,841,687 | A | * | 10/1974 | Banyas | ................... B07C 5/122 198/803.5 |
| 3,856,343 | A | * | 12/1974 | Muller | ..................... B66C 1/46 294/119.3 |

(Continued)

FOREIGN PATENT DOCUMENTS

JP    2016504554 A  *  2/2016
WO   WO96/21137       7/1996
(Continued)

*Primary Examiner* — Larry E Waggle, Jr.
*Assistant Examiner* — Mahdi H Nejad
(74) *Attorney, Agent, or Firm* — Gokalp Bayramoglu

(57) ABSTRACT

It is a major problem encountered in criminology studies, to match the fired bullet with the firearm. One of the acts being featured in the solution of this problem is to provide a holding appropriate for the fired bullet. This invention is about a vacuum powered bullet holder system to be used in forensic analysis of marks on fired bullet.

1 Claim, 1 Drawing Sheet

(56) References Cited

U.S. PATENT DOCUMENTS

| | | | |
|---|---|---|---|
| 4,467,639 A | | 8/1984 | Bush |
| 4,582,353 A | * | 4/1986 | Alvernhe ............. B25J 15/0616 |
| | | | 294/189 |
| 4,901,606 A | * | 2/1990 | Christensen .......... B25B 11/007 |
| | | | 81/53.12 |
| 5,211,435 A | * | 5/1993 | Nagai .................... B65G 47/91 |
| | | | 294/186 |
| 5,213,385 A | * | 5/1993 | Nagai .................... B65G 47/91 |
| | | | 294/189 |
| 5,688,008 A | * | 11/1997 | Hansch ................ B65H 3/0883 |
| | | | 271/103 |
| 6,018,394 A | * | 1/2000 | Baldur ................... G01B 11/00 |
| | | | 356/388 |
| 6,042,341 A | * | 3/2000 | Richter ............... A61M 1/0066 |
| | | | 15/409 |
| 6,219,437 B1 | | 4/2001 | Baldur |
| 6,505,140 B1 | * | 1/2003 | Bachrach ................ F42B 35/00 |
| | | | 702/166 |
| 8,704,111 B2 | * | 4/2014 | Tanaka ................. B25J 15/0616 |
| | | | 177/245 |
| 9,070,544 B1 | * | 6/2015 | Shaps ...................... H01K 3/32 |
| 2007/0193430 A1 | * | 8/2007 | Jang ....................... G10D 3/006 |
| | | | 84/313 |
| 2013/0129464 A1 | * | 5/2013 | Regan ................. B25J 15/0691 |
| | | | 414/800 |
| 2016/0059425 A1 | * | 3/2016 | Andersen ............... B65G 47/91 |
| | | | 294/185 |

FOREIGN PATENT DOCUMENTS

| | | |
|---|---|---|
| WO | WO02/27263 A2 | 4/2002 |
| WO | WO2006/015475 A1 | 2/2006 |
| WO | WO2012/158670 A1 | 11/2012 |
| WO | WO2014076523 A1 * | 5/2014 |

\* cited by examiner

Details of Bullet Holder System

The Bullet

VACUUM POWERED BULLET HOLDER SYSTEM FOR BALLISTIC ANALYSIS

TECHNICAL FIELD

It is a major problem encountered in criminology studies, to match the fired bullet with the firearm. Firearms leave specific marks on the bullet they fire. Experts can determine whether the fired bullet and the firearm match or not, by analysing these marks. Because of this, one of the works being featured in the solution of this problem is to hold the bullet appropriate to analyse the marks correctly by the help of a holder system without preventing the vision of such marks. This invention relates to a vacuum powered bullet holder system to be used in ballistics analysis of marks on fired bullet.

STATE OF THE ART

Various ballistic marks on the cartridge and bullet fired from firearm are analysed and used in matching techniques. Analysis and matching of marks on fired bullets with eye or automatically by using digitized data, and as a result reaching correct information is the purpose. For this purpose, it is necessary to hold the bullet so that it does not drop down. There exists already developed bullet holder systems to help analysing marks on fired bullets correctly available.

In one of these systems (Fired cartridge examination method and imaging apparatus. Roman Baldur, Forensic Technologies, Publication number: WO 96/21137, 11 Jul. 1996.), the conical front end of the fired bullet is attached by using a sticky stuff to the stick of a pulley which exists in the horizontal plane. Rolling motion is achieved using the pulley to analyse the ballistic marks on fired bullet.

Another patent about cartridge holder system in the scope of ballistic analysis, ((Method and apparatus for obtaining a signature from a fired bullet. Roman Baldur, Forensic Technologies. 17 Apr. 2001. U.S. Pat. No. 6,219,437 B1.) is about a different bullet holder system. Such system holds the fired bullet under the microscope or camera by squeezing. Bullet, from its conical front end (56), is placed into a mould with cavity and squeezed by a spring stick from the cylindrical back end. Roll motion is done by a pulley system placed behind the mould with in placed the fired bullet.

In another patent about 3D bullet and cartridge analysis (3D bullet and cartridge case analysis. Eric Nadeau, Myriam Pages et al. Forensic Technologies. 16 Feb. 2006, Patent no: WO 2006/015475 A1), the bullet is attached to a mould from its conical front end (12) using a sticky stuff. The mould has a structure placed on a motor shaft and the roll motion is achieved by this motor. The bullet is held to the mould by using a sticky stuff from its conical front end.

Generally, in these patents, it is protected rolling and holding the bullet by using a sticky stuff from its conical front end or by squeezing from two ends, by aligning vertically to optical axis. In the state of the art, it is also observed that sticky stuff is used to hold the fired bullet. A bullet holder system using air vacuum power to achieve the holding operation is not met in the state of the art.

TECHNICAL PROBLEMS THAT THE INVENTION AIMS TO SOLVE

The invention, in the purpose of appropriate analysis of ballistic marks on fired bullet without preventing the view of marks, achieves holding process providing that the bullet does not drop during analysis, and preventing unwanted moving of bullet which could obstruct appropriate analysis. During hold operation, the view of ballistic marks on fired bullet are not blocked. The invention provides holding operation for fired bullets having various calibres using one system having air vacuum power support. Besides, it is able to hold most of the slightly deformed fired bullets. Optionally, with the help of integrated roll and pitch motors to the system, roll and pitch motion can be achieved on fired bullet during analysis.

BRIEF DESCRIPTION OF THE DRAWINGS

The system designed to conduct the work by using the subject method of this invention and other illustrative figures are illustrated in the annex, and among these illustrations.

Parts in the figure are each given a number and the legend that corresponds to each number is as follows:

TABLE 1

| | |
|---|---|
| 101 | Holder head |
| 102 | Semi-soft mould |
| 103 | Vacuum hole |
| 104 | Pneumatic hose connection (fitting) |
| 105 | First sealing item |
| 106 | Second sealing item |
| 107 | Roll motor housing |
| 108 | Vacuum bushing |
| 109 | Gap for shaft of roll motor |

Figure 2:
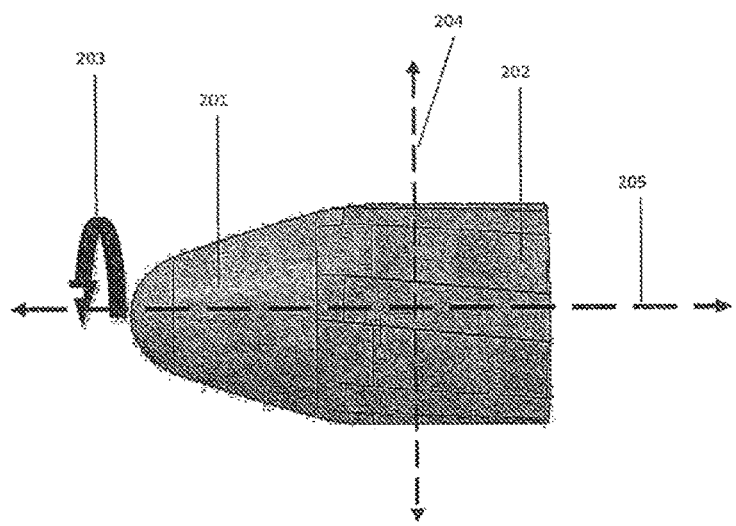

FIG. 2 is the bullet.

Parts in the figure are each given a number and the legend that corresponds to each number is as follows:

TABLE 2

| | |
|---|---|
| 201 | Conical front end |
| 202 | Representative ballistic marks |
| 203 | Roll motion direction |
| 204 | Optical axis |
| 205 | Horizontal axis of bullet |

DETAILED DESCRIPTION OF THE INVENTION

The invention holds the bullet from the conical front end (201), keeps the bullet still via the air vacuum force supplied to the bullet holder system and lets quick and easy visualization of the ballistic marks (202).

The invention is a bullet holder system, which lets the bullet to be rolled while it is held from the conical front end and kept still via the air vacuum force.

Figure 1:
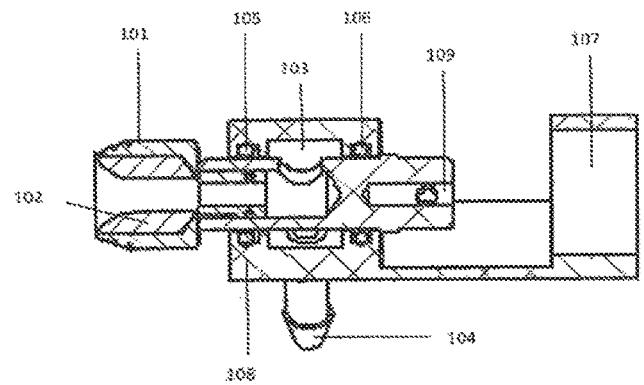
FIG. 1 is the details of bullet holder system.

The cross section of the bullet holder system which transfers the vacuum force to the bullet is shown in FIG. 1. The bullet holder system comprising; holder head (101) containing semi soft mould (102), first sealing item and second sealing item (105,106), pneumatic hose connection (104) and the body containing the vacuum hole (103).

In FIG. 2, a non-deformed bullet is shown. The bullet consists of a conical front end (201) and a cylindrical rear part containing representative ballistic marks (202).

Air vacuum power is generated by an external source. A semi-flexible pneumatic hose, which is flexible enough to ease the assembly and hard enough to prevent the bending, is transferring the air vacuum force from the external source to the bullet holder system. The hose is connected to the pneumatic hose connection (fitting) (104) on the bullet holder system. The fitting and the vacuum bushing (108) connection are hermetically sealed. To minimize the air infiltration during the roll movements, vacuum bushing (108) contains first sealing item and second sealing item (105,106). The holder head (101) is placed into the vacuum bushing (108) and it is held by the first sealing item and second sealing item (105,106) in its position. Flexible rubber hermetical elements prevent the decrease in vacuum power while the holder head (101) is rolling. Semi soft material, which is similar to silicon material, is moulded (102) and placed into the holder head (101). A silicon based material as well as any soft solid chemical can be used in the system. The vacuum hole (103) in the vacuum bushing (108) lets the air vacuum power to be transferred up to the semi soft mould (102) placed into the holder head. Bullet's conical front part (201) is placed into conical shaped semi soft mould (102) of the holder head (101) and kept still via the air vacuum power.

This lets the holding of the non-deformed or slightly deformed bullets. If there exists significant amount of deformation, a special mastic, which lets hermetical seal, is applied to the conical front part (201) of the bullet to be able to hold it.

DESCRIPTION OF THE INDUSTRIAL APPLICATION OF THE INVENTION

This invention provides a bullet holder system for the analysis of ballistic marks on the fired bullet. It can be used as a bullet holder system at data acquisition stage necessary for an autonomous computer supported analyse system for fired bullets. Besides, suitable structured samples, to be analysed under sensor of any optical or digital imaging, may be hold and rolled by bullet holder system, so the sample may be analysed or images may be taken from quite a few points.

The invention claimed is:

1. A bullet holder system to be used in forensic investigations of ballistic marks on a fired bullet, wherein the bullet holder system consists of:
    a head configured to transfer an air vacuum power to the bullet;
    a vacuum bushing and a vacuum hole inside of said vacuum bushing, wherein the head is placed inside the vacuum hole and the vacuum hole is fluidly connected to the head;
    a pneumatic hose connection hermetically sealed to the vacuum bushing and configured to transfer the air vacuum power from an external source;
    wherein, the vacuum bushing has a plurality of sealing elements to hold the head, which allow a negligible amount of air leakage which does not affect a hold operation; and
    a roll motor assembly configured to roll the bullet by 360 degrees and a gap for a shaft of the roll motor assembly, wherein the roller motor assembly is disposed in a roller motor housing;
    wherein, an inner structure of the head transferring the vacuum power to the bullet has a conic shaped shrinking geometry and is coated with a semi soft mould;
    wherein the bullet has a conical front end located inside the conic shaped shrinking geometry of the head; and
    wherein the roller motor housing and the vacuum bushing are stationary seated on a base.

* * * * *